United States Patent
Dingler

(10) Patent No.: US 8,234,765 B2
(45) Date of Patent: Aug. 7, 2012

(54) METHOD FOR REPAIRING THE SURFACE OF A FORMWORK PANEL

(75) Inventor: Gerhard Dingler, Haiterbach (DE)

(73) Assignee: Alkus GmbH & Co. KG, Freiberg (DE)

( * ) Notice: Subject to any disclaimer, the term of this patent is extended or adjusted under 35 U.S.C. 154(b) by 617 days.

(21) Appl. No.: 12/278,413

(22) PCT Filed: Feb. 9, 2007

(86) PCT No.: PCT/DE2007/000262
§ 371 (c)(1),
(2), (4) Date: Aug. 6, 2008

(87) PCT Pub. No.: WO2007/093158
PCT Pub. Date: Aug. 23, 2007

(65) Prior Publication Data
US 2009/0019681 A1    Jan. 22, 2009

(30) Foreign Application Priority Data

Feb. 13, 2006  (DE) .......................... 10 2006 006 408

(51) Int. Cl.
*B23P 6/00* (2006.01)
(52) U.S. Cl. ................................. 29/402.09; 29/402.18
(58) Field of Classification Search ............... 29/402.09, 29/402.18
See application file for complete search history.

(56) References Cited

U.S. PATENT DOCUMENTS

| | | | |
|---|---|---|---|
| 5,271,754 A * | 12/1993 | Bauerecker et al. | ........... 65/17.3 |
| 2002/0187293 A1 | 12/2002 | Schlenker | |
| 2006/0157190 A1 | 7/2006 | Alberto | |
| 2009/0036038 A1* | 2/2009 | Kramer et al. | .................. 451/57 |

FOREIGN PATENT DOCUMENTS

| | | |
|---|---|---|
| DE | 101 14 161 A1 | 9/2002 |
| DE | 101 28 549 A1 | 12/2002 |
| EP | 1 714 782 | 10/2006 |
| FR | 2 626 034 A1 | 7/1989 |
| WO | 2005/042251 | 5/2005 |

OTHER PUBLICATIONS

International Search Report for corresponding PCT Application No. PCT/DE2007/000262 mailed Jul. 20, 2007.

* cited by examiner

*Primary Examiner* — David Bryant
*Assistant Examiner* — Moshe Wilensky
(74) *Attorney, Agent, or Firm* — Cascio & Zervas

(57) ABSTRACT

A method of repairing the surface of a formwork panel made of plastic. The invention provides for a surface coating of the formwork panel to be removed by machining, for example by a milling cutter, and for the formwork panel to be recoated with the same thickness as the removed surface coating. For the repair, the formwork panel can remain in its frame.

25 Claims, 2 Drawing Sheets

METHOD FOR REPAIRING THE SURFACE OF A FORMWORK PANEL

TECHNICAL FIELD OF THE INVENTION

The invention relates to a method for repairing the surface of a formwork panel with the characteristics of the preamble of claim 1. The invention is intended especially for the repair of formwork panels made of plastic or of formwork panels with a plastic surface on the form side.

DESCRIPTION OF THE RELATED ART

From DE 197 24 361 A1, a panel-type construction element is known that can be used as a formwork panel. The known construction element is a laminated composite panel with a panel-type core made of a foamed plastic material onto which a reinforcing layer made of a metal foil, for example, is applied on both sides and is coated with a cover layer made of plastic.

When a formwork panel is handled and used as a form for concrete, the surface of the formwork panel will be damaged over time, suffering scratches and similar indentations. The result is that the appearance of the concrete surface deteriorates.

Therefore, the invention addresses the problem of proposing a method for repairing the surface of a formwork panel of the type described above.

SUMMARY OF THE INVENTION

According to the invention, the surface layer of the formwork panel is not pulled off the formwork panel like a film or foil but is removed in a destructive manner. Scratches and similar indentations in the surface of the formwork panel are removed when the thickness of the removed surface layer is at least as thick as the depth of the scratches or similar damage. If the indentations are deeper, it is necessary to either remove a thicker surface layer from the formwork panel or to fill the indentations in a manner consistent with the material, for example by building-up welding with plastic. The indentations may be filled prior to the removal of the surface layer from the formwork panel. When the surface layer is removed, the filled areas will then be automatically flush with the rest of the surface. However, prior to filling the indentations, it must be determined which indentations in the surface are so deep that they need to be filled. It is also possible to fill the indentations in the surface after the surface layer has been removed, but they must then be made smooth and flush with the surface of the formwork panel by means of polishing, milling, or grinding. It is not absolutely necessary to remove the entire outer layer of a formwork panel, since the removal of a part of the outer layer may be sufficient. The removal of the surface layer improves the surface quality of the formwork panel. Specifically, surface quality refers to the smoothness and/or planeness of the surface of the formwork panel. Indentations in the surface disappear, or at least their depth is reduced. A further advantage of the removal of the surface layer is the improvement of the adhesion of the subsequent coating of the formwork panel. A separating agent applied for the pouring of the concrete, for example form oil, is removed. An adhesion-promoting surface treatment for the subsequent coating, such as for example a primer, corona, or plasma treatment, may be omitted under certain circumstances.

Then, the formwork panel is recoated and ready for use again. With the coating, an additional improvement of the surface quality of the formwork panel is achieved if all surface defects had not been completely eliminated by the removal of the surface layer. With the method according to the invention a repair of a formwork panel that improves its surface is possible. Specifically, it produces a surface quality that is equal to that of a new formwork panel. The method can be performed several times on the same formwork panel. This extends the useful life of the formwork panel by a multiple, in particular as form for exposed concrete surfaces.

One implementation of the invention provides for a machining of the surface. The machining can be performed by means of a geometrically determined blade, for example by means of cutting, or by means of a geometrically indeterminate blade, for example by grinding. Another possibility for the destructive and thereby surface-quality-improving removal of the surface layer is a laser treatment. An erosion process, for example a thermal, chemical, or electrochemical erosion process, may also be considered for the removal of the surface layer. The destructive removal of a surface layer with a certain layer thickness, in particular by machining, has the advantage of improving the quality of the surface because indentations in the surface disappear, or at least their depth is reduced.

Preferably, the subsequent coating of the surface is performed so that it compensates remaining surface defects. Preferably, the application of the coating is performed so that indentations are filled and the resulting surface is free of indentations. In principle, it is also possible to apply a coating with a structured instead of a smooth surface that imparts an image of its structure to the poured concrete.

One implementation of the invention provides for the formwork panel, or in any case its surface, to consist of a plastic material, in particular a thermoplastic material. Here, surface refers to the formwork panel surface that contacts the concrete and is to be repaired. One implementation of the invention also provides for a thermoplastic material to be used for the coating.

In a preferred implementation of the invention, a surface layer is removed whose thickness is the same as the thickness of the new coating. This ensures that the repair does not alter the overall thickness of the formwork panel; after the repair, the surface of the formwork panel has the same position, with reference to a frame of the formwork panel for example, as before the repair.

According to the invention, the coating may be applied in liquid form, for example like an enamel, by means of spray-coating, for example like a powder coating or spray-painting, or by means of pouring. This is not a complete list. In order to accelerate the curing or to increase the strength, the coating may be heated, also, referred to as 'baking' or 'thermally forced drying'. According to one implementation of the invention, the coating has a lower melting temperature than the formwork panel, or at least its region close to the surface. The temperature difference must be large enough to prevent thermal damage to the formwork panel when the coating is melted. For example, the melting temperature of the coating is 130° C. and the formwork panel that includes a thermoplastic material has a melting temperature of approximately 220° C. and a fusing temperature of approximately 160°. In order to achieve good adhesion of the coating, an activation by means of softening the formwork panel at least at its surface is considered favorable. If the formwork panel includes a duroplastic material, its decomposition temperature is the determinant factor instead of the melting temperature, with the decomposition temperature being the temperature at which the duroplastic material is destroyed.

One implementation of the invention provides for the formwork panel to have a frame in which it remains for the repair. Such frames are common with formwork panels for concrete forms, they stiffen the formwork panel and make it possible to assemble and erect formwork panels to produce a form. Sometimes, the formwork panel including the frame is also referred to as formwork panel. Leaving the formwork panel in the frame during the repair significantly reduces the repair effort. In addition, the frame facilitates the automated handling of the formwork panel during the repair because, for the purpose of connecting it to the frames of additional formwork panels or for the attachment of supports, it is equipped with attachment elements by means of which the formwork panel can be mechanically picked up and held.

One implementation of the invention provides for the coating to be applied flush with the frame. It is also of advantage if a gap that may exist between the formwork panel and the frame is closed by the coating to produce a seamless transition from the frame to the formwork panel that is flush with it on the form side. With its elasticity, the coating compensates for relative movements between the frame and the formwork panel that are a consequence of thermal expansion or of mechanical stress, for example.

Additional characteristics of the invention are evident from the following description of the implementations in conjunction with the claims and the drawing. Individual characteristics may be implemented by themselves or together with several others in implementations of the invention.

BRIEF DESCRIPTION OF THE DRAWINGS

Below, the invention is explained in detail by means of implementations shown in the drawing. The figures show process steps of two implementations of the method according to the invention.

DETAILED DESCRIPTION OF THE INVENTION

Figure 1:
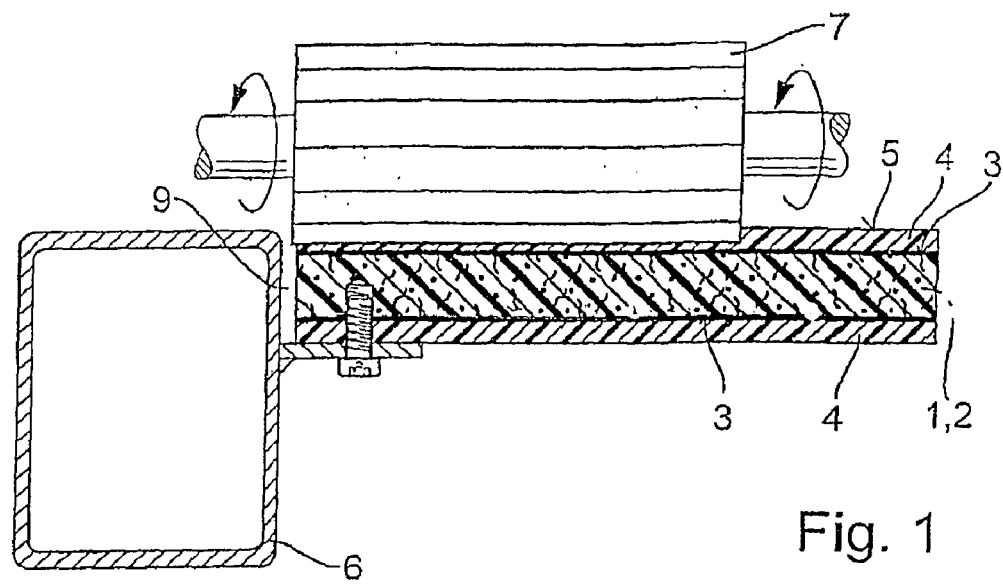
FIG. 1 shows a formwork panel that is attached to a frame and the removal of a surface layer of the form surface by milling.

FIG. 1 shows a formwork panel 1 that is attached to a frame 6. The formwork panel 1 is a laminated composite panel with a core 2 consisting of polypropylene foam that is covered on both sides by aluminum foils 3 as reinforcement layers, while the aluminum foils 3 are covered by outer layers 4 of unfoamed polypropylene. The drawing is not to scale. The frame 6 is a metal frame made of steel or an aluminum alloy, for example. A form surface 5 of the formwork panel 1 is flush with the frame 2.

Figure 2:
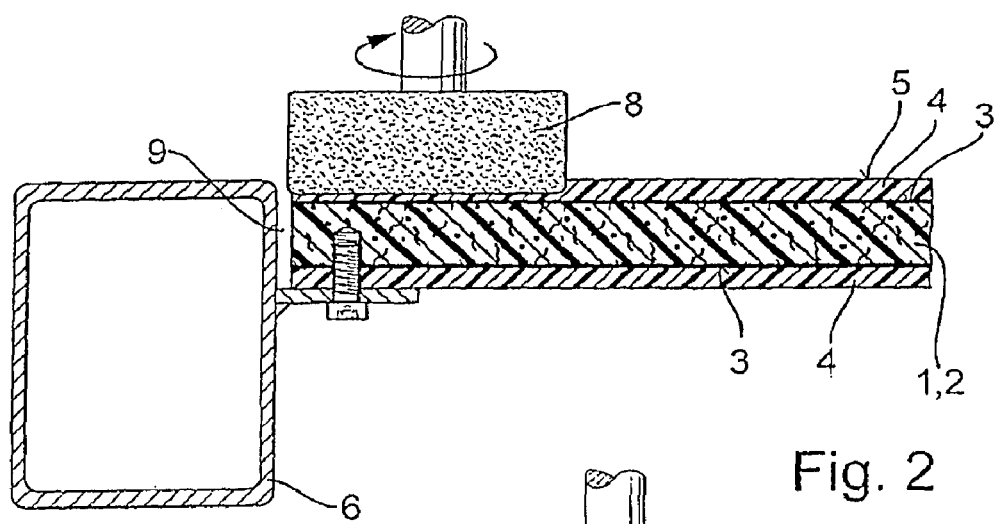
FIG. 2. shows the removal of a surface layer of the form surface by grinding.

During its use as a form and during the pouring of concrete, the formwork panel 1 is damaged, its form surface 5 suffers scratches and similar indentations that are removed by the method according to the invention. For this purpose, a surface layer of the form surface 5 is removed. In the implementation shown in FIG. 1, the surface layer is removed by milling with a milling cutter 7, and in the implementation shown in FIG. 2 by means of grinding with a grinder 8. Both are cutting methods, milling being a process with a geometrically determined blade, and grinding being a process with a geometrically indeterminate blade. Other methods for removal of the surface layer can also be used, for example thermal, chemical, or electrochemical erosion. Only part of the thickness of the outer layer 4 is removed so that the reinforcement layer 3 is not damaged. This removes scratches and indentations with a depth not exceeding the thickness of the removed surface layer. The formwork panel 1 has a plane surface that is milled or ground, for example, and is uniformly lower by the thickness of the removed surface layer than the frame 2. Deeper defects must be repaired, i.e. filled flush with the milled or ground surface with an appropriate material, for example by means of plastic welding, to the extent that they are not compensated by the subsequent coating that will be described below. The milling or grinding depth is shown exaggerated in FIGS. 1 and 2; it may be sufficient to remove less than ½ of the thickness of the outer layer 4.

The cutting process, i.e. the mechanical treatment, pretreats or prepares the form surface 5 for the subsequent coating. A separating agent, for example form oil, that was applied to the formwork panel 1 for the pouring of concrete and may have penetrated the surface of the outer layer 4 is removed along with the surface layer. The mechanical treatment improves the adhesion by roughening the form surface 5. Adhesion can also be achieved by erosion processes, possibly heat treatment, laser treatment of the surface after the removal of the surface layer, or an erosion of the surface layer by means of a laser, etc. In implementations of the invention, this makes it possible to omit a pre-treatment that would otherwise be necessary for promoting the adhesion of the subsequent coating, like for example a primer, corona, or plasma pre-treatment.

Figure 3:
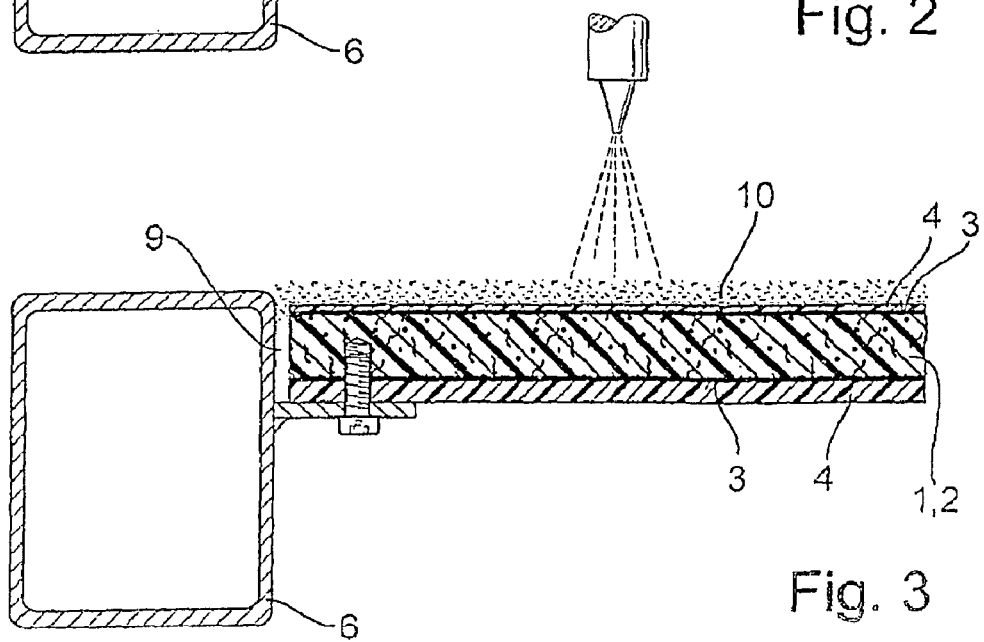
FIG. 3 shows recoating of the form surface with a powder coating.

After the removal of the surface layer and the possibly required filling of deeper indentations that were not removed, the form surface 5 of the formwork panel 1 is re-coated. A powder coating (FIG. 3) or a liquid coating 10 (FIG. 4) is applied, for example. In FIG. 3, the coating is performed with a polypropylene. The coating 10 has a lower melting temperature than the formwork panel 1. The polypropylene of the core 2 and of the outer layers 4 of the formwork panel 1 has a fusing temperature of approximately 160° C. In contrast, the coating has a melting temperature of approximately 130° C. By heating the coating 10 to its melting temperature, the coating 10 is melted and attaches itself positively to the outer layer 4 of the formwork panel 1 while curing. Uneven areas are compensated and the formwork panel 1 receives a plane form surface 5. The heating may be performed up to approximately the fusing temperature of the outer layers 4 of the formwork panel 1 in order to activate its surfaces and improve the adhesion of the coating 10. The coating 10 is applied in a thickness which, after the melting and cooling, duplicates the thickness of the removed surface layer. After the melting and cooling, the form surface 5 is again flush with the frame 6 (FIG. 5), as it was originally. The coating 10 fills a gap 9 between the formwork panel 1 and the frame 6.

Figure 4:
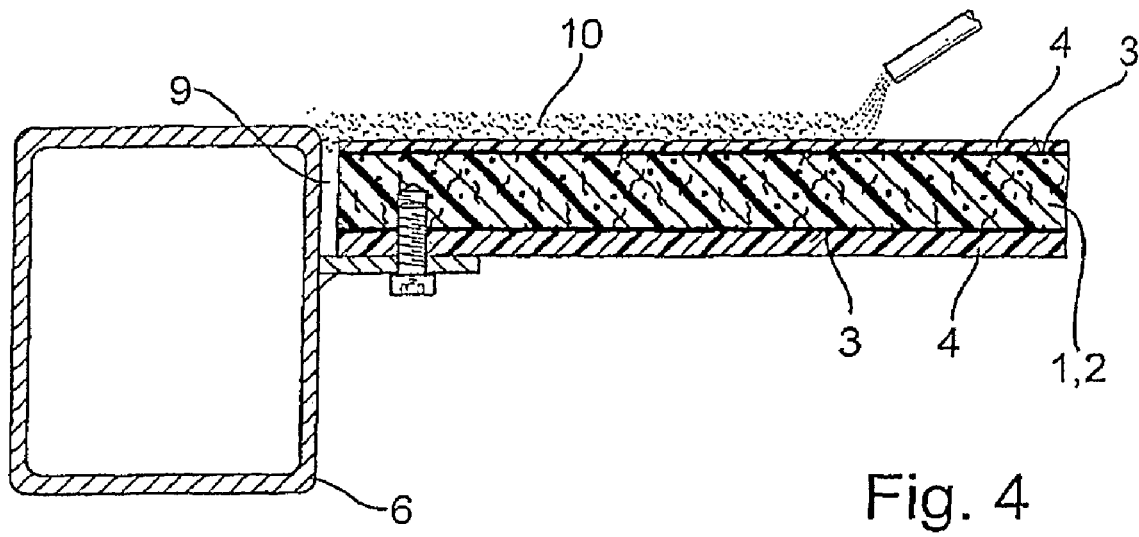
FIG. 4 shows recoating of the form surface with a liquid coating.
Figure 5:
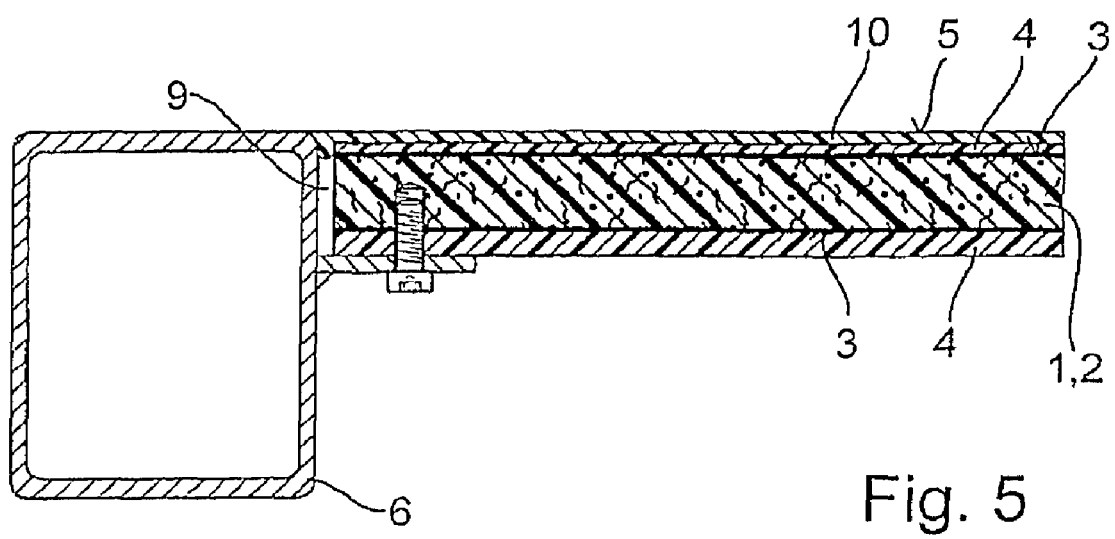
FIG. 5 shows the form surface being flush with the frame.

In FIG. 4, a 2-component liquid enamel is applied as the coating 10 to the horizontally positioned formwork panel 1 and is cured at an increased temperature that activates the surface of the outer layer 4 of the formwork panel. The enamel applied in liquid condition compensates uneven areas of the formwork panel 1 while in horizontal position.

A gap 9 between the formwork panel 1 and the frame 6 makes it possible for the milling cutter 7 or the grinder 8 to extend beyond the edge of the formwork panel 1 without contacting and thereby damaging the frame 6. Also, damage to or a rapid wear of the milling cutter 7 or the grinder 8 is avoided if they do not come into contact with the frame 6 that may be made of steel. Because the tools 7, 8 extend beyond the edge of the formwork panel 1, reliable removal of the surface layer up to the edge of the formwork panel 1 is ensured.

The invention claimed is:

1. A method of replacing a surface of a formwork laminated panel, the laminated panel including a core layer and an outer form layer that stack in a depth direction, the outer form layer forming the outermost portion of the laminated panel and terminating in the surface, the method comprising:
removing a portion of the depth of the entire outer form layer using a non-pulling removal process,
the removal process leaving a treated outer form layer, and
the treated outer form layer having a remaining depth greater than zero;
coating the treated outer form layer to replace the lost depth and thereby form a new surface for the formwork laminated panel.

2. The method according to claim 1, wherein the exterior surface of the treated outer layer is a planar and is smoother than the surface of the outer form layer of the laminated panel prior to the removal process.

3. The method according to claim 1, wherein the portion of the depth of the entire outer form layer is removed destructively.

4. The method according to claim 1, wherein the portion of the depth of the entire outer form layer is removed by machining.

5. The method according to claim 1, wherein coating the treated outer form layer forms a coating that compensates for surface defects in the treated outer form layer such that the coating defines a planar surface.

6. The method according to claim 1, wherein the outer form layer comprises a thermoplastic material.

7. The method according to claim 1, wherein a thermoplastic material is used for the coating.

8. The method according to claim 1, wherein coating the treated outer form layer forms a coating and the thickness of the removed portion of the depth of the entire outer form layer is equal to the thickness of the coating.

9. The method according to claim 1, wherein coating the treated outer form layer comprises spraying or pouring.

10. The method according to claim 1, wherein the coating is performed by the application of a liquid enamel.

11. The method according to claim 1, wherein coating the treated outer form layer forms a coating which has a lower melting temperature than that of the outer form layer.

12. The method according to claim 1, wherein coating the treated outer form layer forms a coating which is applied at a temperature that activates a surface of the treated outer form layer.

13. The method according to claim 1, wherein coating the treated outer form layer forms a coating which attaches itself positively to the formwork panel.

14. The method according to claim 1, wherein the formwork panel has a frame, and that the formwork panel remains in the frame for the repair.

15. The method according to claim 1, wherein coating the treated outer form layer forms a coating and the formwork panel has a frame and that the new coating is applied flush with the frame and that a possible gap between the formwork panel and the frame is closed by the coating.

16. The method according to claim 1 wherein an adhesion-promoting surface treatment is not applied to the treated outer form layer.

17. The method according to claim 1 wherein coating the treated outer form layer forms a coating with the new surface that comprises material that is different from that which forms the outer form layer.

18. A method of replacing a surface of a formwork laminated panel, the laminated panel including a core layer and an outer form layer that stack in a depth direction, the outer form layer forming the outermost portion of the laminated panel and terminating in the surface, the method comprising:
destructively removing a portion of the depth of the entire outer form layer to a desired thickness using a non-pulling removal process,
the removal process leaving a treated outer form layer, and
the treated outer form layer having a remaining depth greater than zero;
coating the treated outer form layer with a melted thermoplastic material, which attaches itself positively to the treated outer form layer as the melted thermoplastic material is cured, to replace the lost depth and thereby form a new surface for the formwork laminated panel.

19. The method according to claim 18 wherein an adhesion-promoting surface treatment is not applied to the treated outer form layer.

20. The method according to claim 18 wherein the outer form layer is made of material that is different from the thermoplastic material that is coated onto the treated outer form layer.

21. The method of according to claim 18 wherein the treated outer form layer has a planar external surface.

22. A method of replacing a surface of a formwork laminated panel, the laminated panel including a core layer and an outer form layer that stack in a depth direction, the outer form layer forming the outermost portion of the laminated panel and terminating in the surface wherein the outer form layer has a defect resulting in a non-planar surface, the method comprising:
removing a portion of the depth of the entire outer form layer using a non-pulling removal process,
the removal process leaving a prepared outer form layer that is free of the defect, and
the prepared outer form layer having a remaining depth greater than zero;
coating the prepared outer form layer to compensate for the defect and to replace the lost depth and thereby form a coating with a new planar surface for the formwork laminated panel wherein the thickness of the coating is equal to the thickness of the portion of the depth of the entire outer form layer that is removed.

23. The method according to claim 22 wherein an adhesion-promoting surface treatment is not applied to the prepared form surface.

24. The method according to claim 22 wherein the coating comprises material that is different from that which forms the outer form layer.

25. The method of according to claim 22 wherein the prepared outer form layer has a planar external surface.

* * * * *